US012789730B2

(12) United States Patent
Gomi et al.

(10) Patent No.: US 12,789,730 B2
(45) Date of Patent: Nov. 10, 2026

(54) VOICE RECOGNITION METHOD AND VOICE RECOGNITION DEVICE

(71) Applicant: Nissan Motor Co., Ltd., Yokohama (JP)

(72) Inventors: Reona Gomi, Kanagawa (JP); Atsunobu Kaminuma, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 92 days.

(21) Appl. No.: 19/107,611

(22) PCT Filed: Jun. 5, 2023

(86) PCT No.: PCT/JP2023/020779
§ 371 (c)(1),
(2) Date: Feb. 28, 2025

(87) PCT Pub. No.: WO2024/053182
PCT Pub. Date: Mar. 14, 2024

(65) Prior Publication Data

US 2026/0070503 A1 Mar. 12, 2026

(30) Foreign Application Priority Data

Sep. 5, 2022 (JP) ................................ 2022-140811

(51) Int. Cl.
*B60R 16/037* (2006.01)
*G10L 15/22* (2006.01)

(52) U.S. Cl.
CPC .......... *B60R 16/0373* (2013.01); *G10L 15/22* (2013.01); *G10L 2015/223* (2013.01)

(58) Field of Classification Search
CPC ..... B60R 16/0373; B60R 16/02; G10L 15/22; G10L 2015/223; G10L 15/00
USPC .......................................................... 704/275
See application file for complete search history.

(56) References Cited

U.S. PATENT DOCUMENTS

| | | | | |
|---|---|---|---|---|
| 8,560,166 B2 * | 10/2013 | Mori | B60W 30/18054 701/32.7 |
| 11,393,469 B2 * | 7/2022 | Kozono | B60K 35/10 |
| 2010/0268412 A1 * | 10/2010 | Mori | B60W 30/18054 701/1 |
| 2020/0202855 A1 * | 6/2020 | Kozono | B60K 35/10 |
| 2022/0310093 A1 * | 9/2022 | Kozono | B60K 35/10 |
| 2026/0070503 A1 * | 3/2026 | Gomi | B60R 16/0373 |

FOREIGN PATENT DOCUMENTS

| | | | |
|---|---|---|---|
| JP | 2007-17839 A | 1/2007 | |
| JP | 2007017839 A * | 1/2007 | |
| JP | 2010247799 A * | 11/2010 | B60W 30/18054 |

(Continued)

*Primary Examiner* — Edwin S Leland, III
(74) *Attorney, Agent, or Firm* — Spencer Fane LLP

(57) ABSTRACT

A controller acquires utterance content of a passenger in a vehicle; acquires an input operation signal generated by the passenger operating an operation input device of the vehicle; estimates a target constituent object, the target constituent object being a constituent object mentioned in the utterance content among a plurality of constituent objects constituting the vehicle, based on the utterance content and the input operation signal; and outputs information relating to the target constituent object.

11 Claims, 5 Drawing Sheets

(56) References Cited

FOREIGN PATENT DOCUMENTS

| | | | | | |
|---|---|---|---|---|---|
| JP | 2017-90613 | A | | 5/2017 | |
| JP | 2017-90614 | A | | 5/2017 | |
| JP | 2017090613 | A | * | 5/2017 | |
| JP | 2017090614 | A | * | 5/2017 | |
| JP | 2020-97378 | A | | 6/2020 | |
| JP | 2020097378 | A | * | 6/2020 | ............. B60K 35/29 |
| JP | 2020154098 | A | * | 9/2020 | ............. G10L 17/24 |
| JP | 2021-43762 | A | | 3/2021 | |
| JP | 2021043762 | A | * | 3/2021 | |
| JP | 7557542 | B2 | * | 9/2024 | ............. G10L 15/00 |
| KR | 102385089 | B1 | * | 4/2022 | ........ H04M 1/72403 |

* cited by examiner

VOICE RECOGNITION METHOD AND VOICE RECOGNITION DEVICE

This application is a U.S. national stage application of International Application No. PCT/JP2023/020779, filed on Jun. 5, 2023, which claims priority based on Japanese Patent Application No. 2022-140811 filed to the Japan Patent Office on Sep. 5, 2022.

BACKGROUND

Technical Field

The present invention relates to a voice recognition method and a voice recognition device.

Background Information

In Japanese Laid-Open Patent Application No. 2020-097378 A (hereinafter referred to as PTL 1), a technology for, when receiving an instruction by voice to an in-vehicle device from a passenger in a vehicle, activating the in-vehicle device and also highlighting an operation part of the in-vehicle device is proposed.

SUMMARY

According to the technology described in PTL 1, although it is possible to inform a passenger of where an operation input device that accepts operation input from the passenger to an in-vehicle device is, it is impossible to inform the passenger of a name or a use of the operation input device.

An object of the present invention is to inform a passenger of information relating to an operation input device that accepts operation input from the passenger to an in-vehicle device.

According to an aspect of the present invention, there is provided a voice recognition method including: acquiring utterance content of a passenger in a vehicle; acquiring an input operation signal generated by the passenger operating an operation input device of the vehicle; estimating a target constituent object, the target constituent object being a constituent object mentioned in the utterance content among a plurality of constituent objects constituting the vehicle, based on the utterance content and the input operation signal; and outputting information relating to the target constituent object.

For example, when in order to start functioning of a driving assistance function of the vehicle, it is required to, after pressing, among a steering switch group installed on the steering wheel, a first switch to switch turning on and off of the driving assistance function, press a second switch to start the functioning of the driving assistance function, the voice recognition method may estimate, based on an input operation signal generated by the passenger pressing the first switch and utterance content "What do I have to do after this?" of the passenger, that a constituent object mentioned in the utterance content is the steering switch group and output an explanation message "Press the second switch" relating to a method for use of the steering switch group as information relating to the steering switch group.

According to the present invention, it is possible to inform a passenger of information relating to an operation input device that accepts operation input from the passenger to an in-vehicle device.

BRIEF DESCRIPTION OF DRAWINGS

Referring now to the attached drawings which form a part of this original disclosure, illustrative embodiments are shown.

DESCRIPTION OF EMBODIMENTS

Embodiments of the present invention will be described below with reference to the drawings. Note that the respective drawings are schematic and do not necessarily depict the actual dimensions or precise configurations of practical implementation of the present invention. The following embodiments of the present invention indicate devices and methods to embody the technical idea of the present invention by way of example, and the technical idea of the present invention does not limit the structures, arrangements, and the like of the constituent components to those described below. The technical idea of the present invention can be subjected to a variety of alterations within the technical scope prescribed by the claims described in CLAIMS.

First Embodiment

Figure 1:
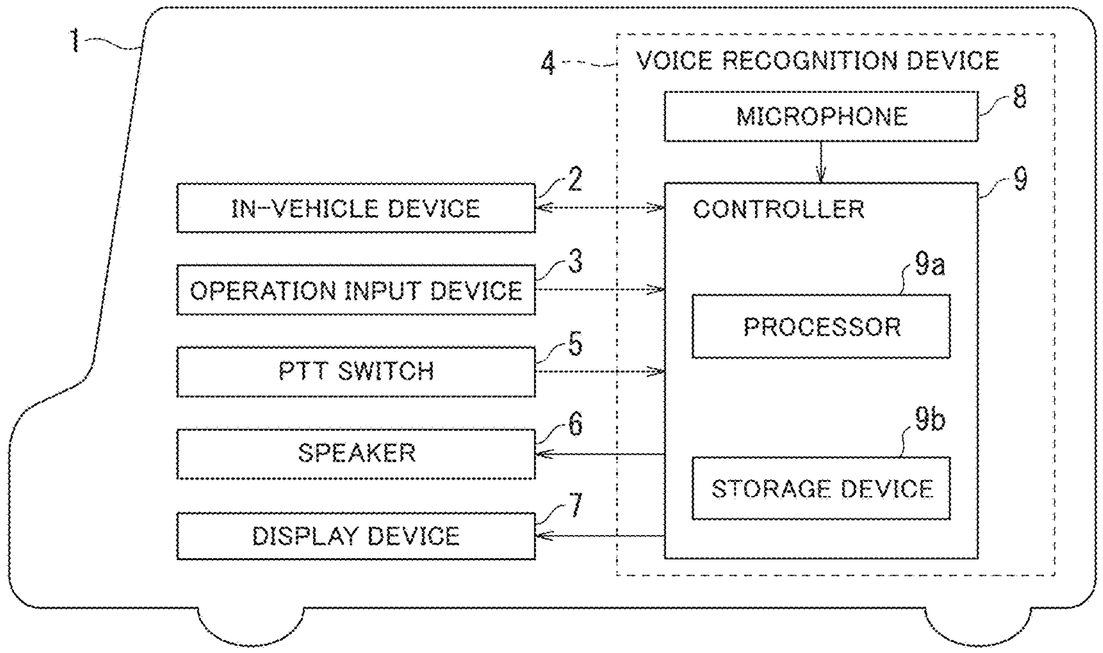
FIG. 1 is a schematic configuration diagram of an example of a vehicle that includes a voice recognition device of embodiments.

FIG. 1 is a schematic configuration diagram of an example of a vehicle that includes a voice recognition device in embodiments. A vehicle 1 includes an in-vehicle device 2, a plurality of operation input devices 3, a voice recognition device 4, a push to talk (PTT) switch 5, a speaker 6, and a display device 7.

The in-vehicle device 2 is one of various types of devices mounted on the vehicle 1. The in-vehicle device 2 may be, for example, an air conditioning device, an audio device, an interior overhead lamp, a glove box, a console lamp, an in-vehicle infotainment (IVI) system, or a navigation device.

The operation input devices 3 are devices that accept operation input from a passenger to the in-vehicle device 2. The operation input devices 3 may be, for example, a push switch, a click switch, a toggle switch, a rocker switch, a magnetic non-contact switch, a capacitive non-contact switch, a jog dial, a jog lever, a knob, a slide bar, a dial controller, or a touch panel.

The push switch may be an alternate-type push switch that maintains a state of a contact even when after pressing a button, a hand is taken off from the button or a momentary-type push switch that, when a hand is taken off from the button, returns to a state before the button is pressed by the hand.

The jog dial is an operation input device that accepts a selection operation or an adjustment operation input by rotating an operation part, such as a dial and a wheel, and also accepts an operation of pushing the operation part.

The jog lever is an operation input device that accepts a selection operation input by tilting a lever and also accepts an operation of pushing the lever.

The dial controller is an operation input device that accepts a selection operation or an adjustment operation input by rotating a dial, a selection operation input by tilting the dial, an operation of pushing the dial, and an operation to a touch pad on an upper surface of the dial (for example, character input).

The voice recognition device 4 recognizes utterance content of a passenger in the vehicle 1 and outputs a guide message answering a question from the passenger relating to an operation input device 3.

The voice recognition device 4 includes a microphone 8 and a controller 9. The microphone 8 is a voice input device that acquires voice input from the passenger. The controller 9 is an electronic control unit (ECU) that performs voice recognition processing of recognizing utterance content of the passenger. The controller 9 includes a processor 9*a* and peripheral components, such as a storage device 9*b*. The processor 9*a* may be, for example, a central processing unit (CPU) or a micro-processing unit (MPU). The storage device 9*b* may include a semiconductor storage device, a magnetic storage device, an optical storage device, or the like. The storage device 9*b* may include a memory, such as a read only memory (ROM) and a random access memory (RAM), a register, and a cache memory. Functions of the controller 9, which will be described below, are achieved by, for example, the processor 9*a* executing computer programs stored in the storage device 9*b*.

The PTT switch 5 is an operation input device for the passenger to instruct start of the voice recognition processing performed by the voice recognition device 4. When the start of the voice recognition processing is instructed by a wake-up word, a dedicated voice command, or operation of an operation input device 3 other than the PTT switch 5 as will be described later, the PTT switch 5 may be omitted.

The speaker 6 is an information presentation device that outputs a voice message generated by the voice recognition device 4. The display device 7 is an information presentation device that displays a character message, an image, a symbol, or a figure generated by the voice recognition device 4.

Figure 2:
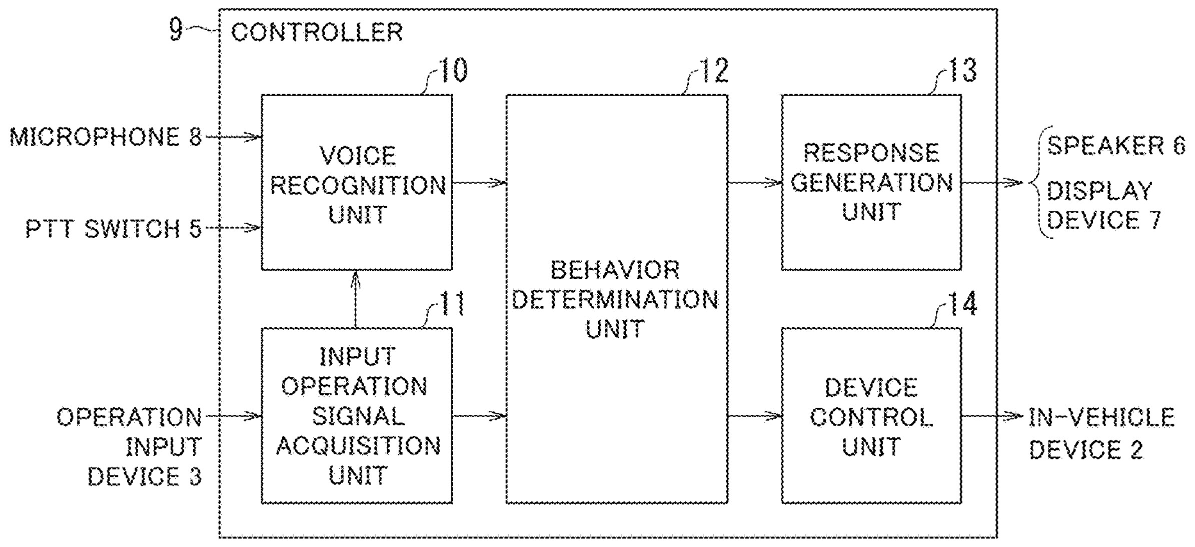
FIG. 2 is a block diagram illustrative of an example of a functional configuration of a controller in FIG. 1.

FIG. 2 is a block diagram of an example of a functional configuration of the controller 9 in FIG. 1. The controller 9 includes a voice recognition unit 10, an input operation signal acquisition unit 11, a behavior determination unit 12, a response generation unit 13, and a device control unit 14.

When the voice recognition device 4 is activated, the voice recognition unit 10 maintains a first stand-by mode until a predetermined voice recognition start event occurs. The voice recognition start event may be voice input of a common wake-up word to start the voice recognition processing (for example, "Hello, X") or input of a dedicated voice command to accept a question by voice relating to an operation input device 3 (for example, "Can I ask a question about the switch?"). Alternatively, the voice recognition start event may be operation of the PTT switch 5.

When a voice recognition start event occurs, the voice recognition unit 10 starts the voice recognition processing. The voice recognition unit 10 recognizes voice input from the passenger that the microphone 8 acquired and converts the voice input to language information, such as a text. The voice recognition unit 10 analyzes the language information, using natural language processing and acquires utterance content of a user.

For example, the voice recognition unit 10 extracts a keyword that means an operation input device 3 (for example, "switch", "lever", or "dial"), as utterance content.

In addition, the voice recognition unit 10 may extract a type of a question relating to an operation input device 3, as utterance content. For example, when the utterance content is "What is this switch?", the voice recognition unit 10 may determine that the type of the question from the passenger is a "question relating to a name" of the operation input device 3.

In addition, for example, when the utterance content is "Which is the switch to do X?" or "Where is the switch to do X?", the voice recognition unit 10 may determine that the type of the question from the passenger is a "question relating to a use and a position" of the operation input device 3.

In addition, for example, when the utterance content is "Is it correct that this switch is X?", the voice recognition unit 10 may determine that the type of the question from the passenger is "confirmation of a name" of the operation input device 3.

In addition, for example, when the utterance content is "I want to do X, but is this switch correct one to do that?", the voice recognition unit 10 may determine that the type of the question from the passenger is "confirmation of a use and a position" of the operation input device 3.

The voice recognition unit 10 outputs the acquired utterance content to the behavior determination unit 12.

The input operation signal acquisition unit 11 acquires, with respect to each of the plurality of operation input devices 3, an input operation signal generated by the passenger operating the operation input device 3. The input operation signal acquisition unit 11 determines, with respect to each operation input device 3, whether or not an input operation signal satisfies a predetermined operation determination condition. When finding an operation input device 3 that satisfies the operation determination condition, the input operation signal acquisition unit 11 generates an operation detection signal that identifies an operation input device 3 satisfying the operation determination condition. The operation detection signal may include identification information of an operation input device 3 satisfying the operation determination condition.

For example, the input operation signal acquisition unit 11 determines that an input operation signal satisfies the predetermined operation determination condition in the following cases.

(1) A case where the push switch or the click switch is pressed, a case where the dial of the jog dial or the dial controller is pressed, or a case where the lever of the jog lever is pressed.

(2) A case where the toggle switch or the rocker switch, the lever of the jog lever, or the dial of the dial controller is tilted to a position at which the operation input device 3 is brought into one of operation states.

(3) A case where a magnet is located away from the magnetic non-contact switch.

(4) A case where a change in capacitance is sensed due to a hand being held over the capacitive non-contact switch or an article being placed on the capacitive non-contact switch.

(5) A case where the dial of the jog dial or the dial controller rotates.

(6) A case where the knob rotates.

(7) A case where the bar of the slide bar is slid.

(8) A case where a change in capacitance of the touch pad on the upper surface of the dial of the dial controller is sensed.

(9) A case where a state of a graphical user interface (GUI) on a screen of the touch panel changes or a selection operation is performed on the GUI by touching a surface of the touch panel or sliding a finger in contact with the surface.

Note that an operation input device 3 that is capable of accepting a plurality of types of operations with a single operation part exists. For example, the jog dial is capable of accepting a selection operation or an adjustment operation performed by rotating the operation part, such as the dial and the wheel, and an operation of pushing the operation part. The jog lever is capable of accepting a selection operation performed by tilting the lever and an operation of pushing the lever. The dial controller is capable of accepting a selection operation or an adjustment operation performed by rotating the dial, a selection operation performed by tilting the dial, an operation of pushing the dial, and an operation on a touch pad on the upper surface of the dial (for example, character input).

In the case of the operation input device 3 as described above, different operation detection signals may be generated with respect to different types of operations. For example, the operation detection signals may include identification information to identify the type of operation.

The input operation signal acquisition unit 11 outputs the input operation signal acquired from an operation input device 3 and the operation detection signal to the behavior determination unit 12.

The behavior determination unit 12 switches behaviors of the voice recognition device 4 according to an acquisition result of utterance content of the passenger and an acquisition result of an input operation signal of an operation input device 3.

That is, when the input operation signal acquisition unit 11 acquires an input operation signal from an operation input device 3 and the voice recognition unit 10 acquires utterance content including a question relating to the operation input device 3, the behavior determination unit 12 outputs a response generation command commanding a guide message answering the utterance content to be generated, to the response generation unit 13 and causes the response generation unit 13 to output a guide message answering the question relating to the operation input device 3.

On the other hand, when the voice recognition unit 10 does not acquire utterance content including a question relating to an operation input device 3 even when the input operation signal acquisition unit 11 acquires an input operation signal from the operation input device 3, the behavior determination unit 12 outputs the input operation signal acquired from the operation input device 3 to the device control unit 14. The device control unit 14 controls the in-vehicle device 2 in accordance with the input operation signal.

Specifically, when the input operation signal acquisition unit 11 acquires an input operation signal from an operation input device 3 and the voice recognition unit 10 acquires utterance content including a question relating to the operation input device 3, the behavior determination unit 12 estimates, based on the utterance content acquired by the voice recognition unit 10 and the input operation signal acquired by the input operation signal acquisition unit 11, an operation input device 3 that is mentioned in the utterance content of the passenger among the plurality of operation input devices 3 constituting the vehicle 1.

For example, the behavior determination unit 12 estimates, based on the utterance content acquired by the voice recognition unit 10 and the operation detection signal output by the input operation signal acquisition unit 11, an operation input device 3 mentioned in the utterance content. The operation input device 3 is an example of a "constituent object constituting a vehicle" described in the claims.

In the first embodiment, when after acquisition of an input operation signal output from an operation input device 3, utterance content including a question relating to an operation input device 3 is acquired, the behavior determination unit 12 estimates that the operation input device 3 that output the input operation signal is the operation input device 3 that is mentioned in the utterance content of the passenger. For example, when utterance content including a question relating to an operation input device 3 is acquired before a predetermined period elapses after acquisition of an input operation signal, the behavior determination unit 12 may estimate that the operation input device 3 that output the input operation signal is the operation input device 3 that is mentioned in the utterance content of the passenger.

In addition, the behavior determination unit 12 may determine that an input operation signal is acquired, when, for example, an operation detection signal is received from the input operation signal acquisition unit 11.

When the behavior determination unit 12 estimates an operation input device 3 mentioned in utterance content, the behavior determination unit 12 outputs a response generation command commanding the response generation unit 13 to generate a guide message answering the utterance content, to the response generation unit 13. For example, the response generation command may include identification information of the estimated operation input device 3 and identification information of a type of a question (such as a "question relating to a name", a "question relating to a use and a position", "confirmation of a name", and "confirmation of a use and a position") included in the utterance content of the passenger.

The response generation unit 13 outputs a guide message including a voice or an image representing information relating to the estimated operation input device 3 from the speaker 6 or the display device 7 as a response to the question included in the utterance content of the passenger, based on the response generation command received from the behavior determination unit 12.

In this case, the controller 9 may suspend output of the input operation signal acquired from the operation input device 3 to the device control unit 14 until the response generation unit 13 outputs a guide message. That is, the controller 9 may suspend control of the in-vehicle device 2 even when an input operation signal is acquired by the operation input device 3 being operated.

For example, the response generation unit 13 may generate a voice guide message representing information relating to an estimated operation input device 3 and output the voice guide message from the speaker 6. In addition, for example, the response generation unit 13 may generate a guide message expressed by character information, an image, a symbol, or a figure representing information relating to an estimated operation input device 3 and output the guide message, the image, the symbol, or the figure from the display device 7.

Specific examples of the message generated by the response generation unit 13 will be described below.

(Example 1) In a case where the operation input device 3 is a volume control switch of the audio device, an operation detection signal is output when the switch is pressed. In this case, the operation input device 3 may be, for example, a push switch, a click switch, a jog lever (at the time of pushing operation), or a dial controller (at the time of pushing operation).

When the utterance content is "What is this switch?", the voice recognition unit 10 determines that the type of the question is a "question relating to a name". The response generation unit 13 outputs a guide message "This is a volume control switch. You can increase volume by pressing the '+' side and decrease volume by pressing the '−' side." that includes information relating to a name and a method for use.

When the utterance content is "Which is the switch to control volume?", the voice recognition unit 10 determines that the type of the question is a "question relating to a use and a position". The response generation unit 13 outputs a guide message "Volume control can be operated by a switch on the left side of the steering wheel on which a '+' mark and a '−' mark are printed. You can increase volume by pressing the '+' side and decrease volume by pressing the '−' side." that includes information relating to a use, a position, and a method for use.

When the utterance content is "Is it correct that this switch is the volume control switch?", the voice recognition unit 10 determines that the type of the question is "confirmation of a name". The response generation unit 13 outputs a guide message "Yes, it is. You can increase volume by pressing the '+' side and decrease volume by pressing the '−' side.".

When the utterance content is "I want to control volume, but is this button correct one to do that?", the voice recognition unit 10 determines that the type of the question is "confirmation of a use and a position". The response generation unit 13 outputs a guide message "Yes, it is. You can increase volume by pressing the '+' side and decrease volume by pressing the '−' side.".

(Example 2) In a case where the operation input device 3 is an item selection switch of the navigation device, an operation detection signal is output when the lever is tilted to a position at which the switch is brought into one of operation states. In this case, the operation input device 3 may be, for example, a toggle switch, a rocker switch, a jog lever (in a case of tilting the lever), or a dial controller (in a case of tilting the dial).

When the utterance content is "What is this switch?", the voice recognition unit 10 determines that the type of the question is a "question relating to a name". The response generation unit 13 outputs a guide message "This is an item selection switch. An item you want to select can be focused on by tilting or pressing the lever vertically and horizontally." that includes information relating to a name and a method for use.

When the utterance content is "Which is the switch to move cursor/select item?", the voice recognition unit 10 determines that the type of the question is a "question relating to a use and a position". For example, the response generation unit 13 outputs a guide message "Item selection can be operated with a round knob-shaped dial on the console. An item you want to select can be focused on by tilting or pressing the dial vertically and horizontally or rotating the dial clockwise and counterclockwise." that includes information relating to a use, a position, and a method for use.

When the utterance content is "Is it correct that this switch is the switch to move cursor/select item?", the voice recognition unit 10 determines that the type of the question is "confirmation of a name". For example, the response generation unit 13 outputs a guide message "Yes, it is. An item you want to select can be focused on by tilting or pressing the dial vertically and horizontally or rotating the dial clockwise and counterclockwise.".

When the utterance content is "I want to select an item, but is this button correct one to do that?", the voice recognition unit 10 determines that the type of the question is "confirmation of a use and a position". For example, the response generation unit 13 outputs a guide message "Yes, it is. An item you want to select can be focused on by tilting or pressing the dial vertically and horizontally or rotating the dial clockwise and counterclockwise.".

(Example 3) In a case where the operation input device 3 is an opening/closing interlock switch of the glove box, an operation detection signal is output when the magnet is located away from the magnetic non-contact switch that is an opening/closing interlock switch.

When the utterance content is "What is the switch that turns on the light in the storage in front of the passenger seat?", the voice recognition unit 10 determines that the type of the question is a "question relating to a name". The response generation unit 13 outputs a guide message "This is an opening/closing interlock switch of the glove box. The light is turned on when the box is opened, and the light is turned off when the box is closed." that includes information relating to a name and a method for use.

When the utterance content is "Which is the switch to turn on the light in the glove box?", the voice recognition unit 10 determines that the type of the question is a "question relating to a use and a position". The response generation unit 13 outputs a guide message "The glove box is the drawer in front of the passenger seat. The glove box can be operated by opening and closing the lid of the glove box. The light is turned on when the box is opened, and the light is turned off when the box is closed." that includes information relating to a use, a position, and a method for use.

When the utterance content is "Is it correct that this switch is the switch to turn on the light in the glove box?", the voice recognition unit 10 determines that the type of the question is "confirmation of a name". The response generation unit 13 outputs a guide message "Yes, it is. The light is turned on when the box is opened, and the light is turned off when the box is closed.".

When the utterance content is "I want to turn on the light in the glove box, but where is the switch?", the voice recognition unit 10 determines that the type of the question is "confirmation of a use and a position". The response generation unit 13 outputs a guide message "The glove box is the drawer in front of the passenger seat. The glove box can be operated by opening and closing the lid of the glove box. The light is turned on when the box is opened, and the light is turned off when the box is closed.".

(Example 4) In a case where the operation input device 3 is the capacitive non-contact switch that turns on and off the console lamp, an operation detection signal is output when a change in capacitance is sensed due to a hand being held over the capacitive non-contact switch or an article being placed on the capacitive non-contact switch.

When the utterance content is "What is this switch?", the voice recognition unit 10 determines that the type of the question is a "question relating to a name". The response generation unit 13 outputs a guide message "This is a switch of the interior console lamp. You can turn on and off the console lamp by holding your hand over the switch." that includes information relating to a name and a method for use.

When the utterance content is "Which is the switch of the interior console lamp?", the voice recognition unit 10 determines that the type of the question is a "question relating to a use and a position". The response generation unit 13 outputs a guide message "The console lamp can be operated by a switch arranged in the center console. You can turn on and off the console lamp by holding your hand over the switch." that includes information relating to a use, a position, and a method for use.

When the utterance content is "Is it correct that this switch is the console lamp switch?", the voice recognition unit 10 determines that the type of the question is "confirmation of a name". The response generation unit 13 outputs a guide message "Yes, it is. You can turn on and off the console lamp by holding your hand over the switch.".

When the utterance content is "I want to turn on the console lamp, but is this button correct one to do that?", the voice recognition unit 10 determines that the type of the question is "confirmation of a use and a position". The response generation unit 13 outputs a guide message "Yes, it is. You can turn on and off the console lamp by holding your hand over the switch.".

(Example 5) In a case where the operation input device 3 is a volume control dial of the audio device, an operation detection signal is output when the passenger rotates the dial. In this case, the operation input device 3 may be, for example, a jog dial (at the time of rotation operation), or a dial controller (at the time of rotation operation).

When the utterance content is "What is this dial?", the voice recognition unit 10 determines that the type of the question is a "question relating to a name". The response generation unit 13 outputs a guide message "This is a volume control dial. You can decrease volume by rotating the dial counterclockwise and increase volume by rotating the dial clockwise." that includes information relating to a name and a method for use.

When the utterance content is "Which is the dial to control volume?", the voice recognition unit 10 determines that the type of the question is a "question relating to a use and a position". The response generation unit 13 outputs a guide message "Volume control can be operated by a round knob-type dial on the lower left side of the IVI screen. You can decrease volume by rotating the dial counterclockwise and increase volume by rotating the dial clockwise." that includes information relating to a use, a position, and a method for use.

When the utterance content is "Is it correct that this dial is the volume control dial?", the voice recognition unit 10 determines that the type of the question is "confirmation of a name". The response generation unit 13 outputs a guide message "Yes, it is. You can decrease volume by rotating the dial counterclockwise and increase volume by rotating the dial clockwise.".

When the utterance content is "I want to control volume, but is this button correct one to do that?", the voice recognition unit 10 determines that the type of the question is "confirmation of a use and a position". The response generation unit 13 outputs a guide message "Yes, it is. You can decrease volume by rotating the dial counterclockwise and increase volume by rotating the dial clockwise.".

(Example 6) In a case where the operation input device 3 is an airflow volume control knob of the air conditioning device, an operation detection signal is output when the passenger rotates the knob.

When the utterance content is "What is this switch?", the voice recognition unit 10 determines that the type of the question is a "question relating to a name". The response generation unit 13 outputs a guide message "This is an airflow volume control switch. You can decrease airflow volume by rotating the switch counterclockwise and increase airflow volume by rotating the switch clockwise." that includes information relating to a name and a method for use.

When the utterance content is "Which is the switch to control airflow volume?", the voice recognition unit 10 determines that the type of the question is a "question relating to a use and a position". The response generation unit 13 outputs a guide message "Airflow volume control can be operated by a knob on the lower side of the IVI. You can decrease airflow volume by rotating the knob counterclockwise and increase airflow volume by rotating the knob clockwise." that includes information relating to a use, a position, and a method for use.

When the utterance content is "Is it correct that this switch is the airflow volume control switch?", the voice recognition unit 10 determines that the type of the question is "confirmation of a name". The response generation unit 13 outputs a guide message "Yes, it is. You can decrease airflow volume by rotating the switch counterclockwise and increase airflow volume by rotating the switch clockwise.".

When the utterance content is "I want to control airflow volume, but is this button correct one to do that?", the voice recognition unit 10 determines that the type of the question is "confirmation of a use and a position". The response generation unit 13 outputs a guide message "Yes, it is. You can decrease airflow volume by rotating the button counterclockwise and increase airflow volume by rotating the button clockwise.".

(Example 7) In a case where the operation input device 3 is a slide bar used as an interior overhead lamp switch, an operation detection signal is output when the passenger slides the bar.

When the utterance content is "What is this switch?", the voice recognition unit 10 determines that the type of the question is a "question relating to a name". The response generation unit 13 outputs a guide message "This is an interior overhead lamp switch. Switching-off, door interlock switching, and switching-on of the interior overhead lamp can be operated by sliding the switch to the left side, the center, and the right side, respectively." that includes information relating to a name and a method for use.

When the utterance content is "Which is the switch to use the interior overhead lamp?", the voice recognition unit 10 determines that the type of the question is a "question relating to a use and a position". The response generation unit 13 outputs a guide message "The interior overhead lamp can be operated by a slide switch around the rearview mirror on the ceiling. Switching-off, door interlock switching, and switching-on of the interior overhead lamp can be operated by sliding the switch to the left side, the center, and the right side, respectively." that includes information relating to a use, a position, and a method for use.

When the utterance content is "Is it correct that this switch is the interior overhead lamp switch?", the voice recognition unit 10 determines that the type of the question is "confirmation of a name". The response generation unit 13 outputs a guide message "Yes, it is. Switching-off, door interlock switching, and switching-on of the interior overhead lamp can be operated by sliding the switch to the left side, the center, and the right side, respectively.".

When the utterance content is "I want to use the interior overhead lamp, but is this button correct one to do that?", the voice recognition unit 10 determines that the type of the question is "confirmation of a use and a position". The response generation unit 13 outputs a guide message "Yes, it is. Switching-off, door interlock switching, and switching-on of the interior overhead lamp can be operated by sliding the button to the left side, the center, and the right side, respectively.".

(Example 8) In a case where the operation input device 3 is a dial controller used for input operation to the navigation device or operation of the audio device, an operation detection signal is output when a change in capacitance of the touch pad on the upper surface of the dial is sensed.

When the utterance content is "What is this switch?", the voice recognition unit 10 determines that the type of the question is a "question relating to a name". The response generation unit 13 outputs a guide message "This is a dial controller. You can manually input a character on the surface of the dial. You can also perform item selection and volume control by rotating the knob clockwise and counterclockwise or tilting the knob back-and-forth and right-and-left and then pressing it." that includes information relating to a name and a method for use.

When the utterance content is "Which is the switch to manually input a character?", the voice recognition unit 10 determines that the type of the question is a "question relating to a use and a position". The response generation unit 13 outputs a guide message "Regarding manual input of a character, you can manually input a character on the surface of the dial. You can also perform item selection and volume control by rotating the knob clockwise and counterclockwise or tilting the knob back-and-forth and right-and-left and then pressing it." that includes information relating to a use, a position, and a method for use.

When the utterance content is "Is it correct that this switch is the switch enabling character input?", the voice recognition unit 10 determines that the type of the question is "confirmation of a name". The response generation unit 13 outputs a guide message "Yes, it is. You can manually input a character on the surface of the dial. You can also perform item selection and volume control by rotating the knob clockwise and counterclockwise or tilting the knob back-and-forth and right-and-left and then pressing it."

When the utterance content is "I want to manually input a character, but is this button correct one to do that?", the voice recognition unit 10 determines that the type of the question is "confirmation of a use and a position". The response generation unit 13 outputs a guide message "Yes, it is. You can manually input a character on the surface of the dial. You can also perform item selection and volume control by rotating the knob clockwise and counterclockwise or tilting the knob back-and-forth and right-and-left and then pressing it."

(Example 9) In a case where the operation input device 3 is a touch panel on the screen of the IVI, an operation detection signal is output when the state of the GUI of the touch panel changes or the selection operation is performed by the passenger touching the surface of the touch panel or sliding a finger in contact with the surface.

When the utterance content is "What is this switch?", the voice recognition unit 10 determines that the type of the question is a "question relating to a name". The response generation unit 13 outputs a guide message "This is a setting icon of the IVI. You can perform language setting and setting relating to the navigation device, the phone, and so on." that includes information relating to a name.

When the utterance content is "Which is the switch to set the IVI?", the voice recognition unit 10 determines that the type of the question is a "question relating to a use and a position". The response generation unit 13 outputs a guide message "Setting of the IVI can be operated by a gear icon on the upper right side or the upper left side on the IVI screen. You can perform language setting and setting relating to the navigation device, the phone, and so on." that includes information relating to a use, a position, and a method for use.

When the utterance content is "Is it correct that this switch is the setting switch of the IVI?", the voice recognition unit 10 determines that the type of the question is "confirmation of a name". The response generation unit 13 outputs a guide message "Yes, it is. You can perform language setting and setting relating to the navigation device, the phone, and so on.".

When the utterance content is "I want to set the IVI, but is this button correct one to do that?", the voice recognition unit 10 determines that the type of the question is "confirmation of a use and a position". The response generation unit 13 outputs a guide message "Yes, it is. You can perform language setting and setting relating to the navigation device, the phone, and so on.".

Note that there are some cases where a plurality of types of operations can be accepted by a single operation input device 3, such as the jog dial, the jog lever, and the dial controller.

When different names or uses are assigned to different types of operations of such an operation input device 3, the response generation unit 13 may generate a guide message including information about different names or uses with respect to the single operation input device 3.

For example, in a case where when a pushing operation of the dial controller is performed as described above (Example 1), utterance content including a question from the passenger relating to the operation input device 3 is acquired, the response generation unit 13 may generate a guide message informing that the name and use of the dial controller are "volume control switch" and "volume control", respectively.

On the other hand, in a case where when the dial of the dial controller is tilted to a position at which the dial controller is brought into one of operation states as described above (Example 2) (at the time of lever operation), utterance content including a question from the passenger relating to the operation input device 3 is acquired, the response generation unit 13 may generate a guide message informing that the name and use of the dial controller are "item selection switch" and "focusing on an item to be selected", respectively.

In addition, when a plurality of types of operations can be accepted by a single operation input device 3, a use may be uniquely assigned to a combination or sequence of a series of different kinds of operations. For example, a first use may be assigned to an operation of tilting the dial controller while rotating the dial controller, and a second use may be assigned to an operation of pressing the dial controller while tilting the dial controller.

In this case, in a case where when a series of different types of operations are performed on an operation input device 3, utterance content including a question from the passenger relating to the operation input device 3 is acquired, the response generation unit 13 may generate a guide message informing a use assigned to a combination or sequence of the operations.

When while the response generation unit 13 is outputting a guide message (that is, during a period after start of output of the guide message before completion of the output of the guide message), the passenger desires to suspend the guide message, the passenger can perform a predetermined suspension instruction operation. For example, the passenger may perform the suspension instruction operation by operating the operation input device 3 mentioned in the utterance content again, perform the suspension instruction operation by operating an operation input device other than the operation input device mentioned in the utterance content among the plurality of operation input device 3, perform the suspension instruction operation by holding down the PTT switch 5, or perform the suspension instruction operation by speaking a specific keyword (for example, "Stop the guidance.").

When accepting the suspension instruction operation, the response generation unit 13 suspends output of a guide message. In addition, the behavior determination unit 12 outputs an input operation signal acquired from the operation input device 3 to the device control unit 14. The device control unit 14 controls the in-vehicle device 2 in accordance with the input operation signal.

When no utterance content of the passenger is acquired within a predetermined period (for example, 3 sec.) even when an input operation signal is acquired, the voice recognition unit 10 terminates the voice recognition processing. In this case, the behavior determination unit 12 does not perform estimation of an operation input device 3 based on utterance by the passenger, and the response generation unit 13 does not output a guide message including information about the operation input device 3 and outputs a termination guide message "Voice recognition is terminated." that informs the passenger of termination of the voice recognition processing.

In addition, the behavior determination unit 12 outputs an input operation signal acquired from the operation input device 3 to the device control unit 14. The device control unit 14 controls the in-vehicle device 2 in accordance with the input operation signal.

In addition, when the input operation signal acquisition unit 11 does not acquire an input operation signal within a predetermined period even when the voice recognition unit 10 detects a voice recognition start event, the behavior determination unit 12 also does not perform estimation of an operation input device 3 based on utterance by the passenger. The response generation unit 13, without outputting a guide message including information about the operation input device 3, outputs the termination guide message.

In addition, when the input operation signal acquisition unit 11 acquires an input operation signal before the voice recognition unit 10 detects a voice recognition start event (that is, before the voice recognition processing is started), the behavior determination unit 12 does not perform estimation of an operation input device 3 based on utterance by the passenger and outputs the input operation signal acquired from the operation input device 3 to the device control unit 14. As a result, the response generation unit 13 does not output a guide message including information about the operation input device 3, and the device control unit 14 controls the in-vehicle device 2 in accordance with the input operation signal.

Operation

Figure 3:
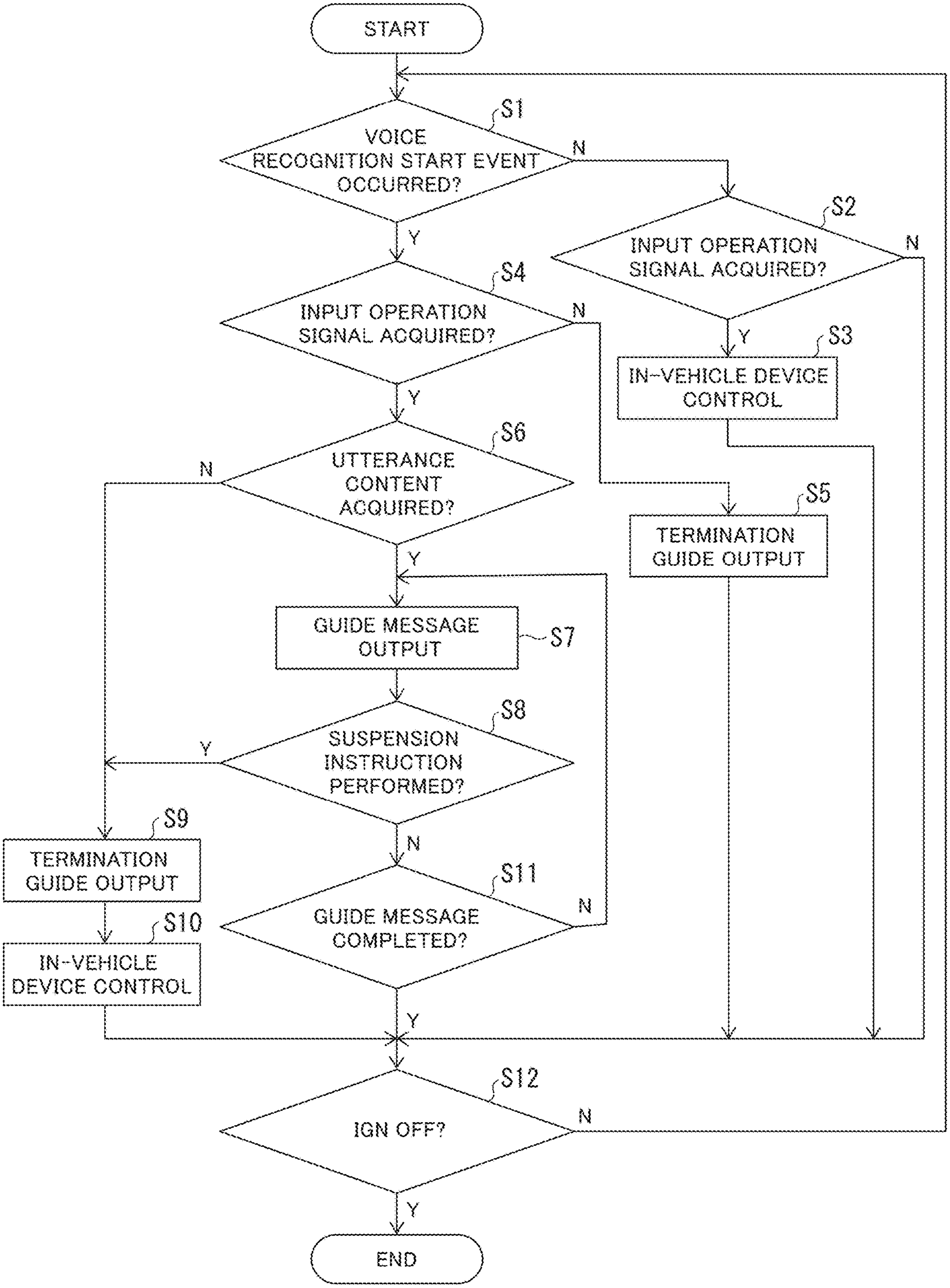
FIG. 3 is a flowchart of an example of a voice recognition method of a first embodiment.

FIG. 3 is a flowchart of an example of a voice recognition method of the first embodiment. In step S1, the voice recognition unit 10 determines whether or not a voice recognition start event has occurred. When a voice recognition start event has occurred (step S1: Y), the process proceeds to step S4. When no voice recognition start event has occurred (step S1: N), the process proceeds to step S2. In step S2, the input operation signal acquisition unit 11 determines whether or not the input operation signal acquisition unit 11 has acquired an input operation signal. When the input operation signal acquisition unit 11 has acquired an input operation signal (step S2: Y), the process proceeds to step S3. When the input operation signal acquisition unit 11 has not acquired an input operation signal (step S2: N), the process proceeds to step S12. In step S3, the behavior determination unit 12 outputs the input operation signal to the device control unit 14. The device control unit 14 controls the in-vehicle device 2 in accordance with the input operation signal. Subsequently, the process proceeds to step S12.

In step S4, the input operation signal acquisition unit 11 determines whether or not the input operation signal acquisition unit 11 has acquired an input operation signal. When the input operation signal acquisition unit 11 has acquired an input operation signal (step S4: Y), the process proceeds to step S6. When the input operation signal acquisition unit 11 has not acquired an input operation signal (step S4: N), the process proceeds to step S5. In step S5, the response generation unit 13 outputs a termination guide message. Subsequently, the process proceeds to step S12.

In step S6, the behavior determination unit 12 determines whether or not the voice recognition unit 10 has acquired utterance content of the passenger. When the voice recognition unit 10 has acquired utterance content (step S6: Y), the process proceeds to step S7. When the voice recognition unit 10 has not acquired utterance content (step S6: N), the process proceeds to step S9.

In step S7, the behavior determination unit 12 estimates, based on the utterance content and the input operation signal, an operation input device 3 that is mentioned in the utterance content of the passenger among the plurality of operation input devices 3 constituting the vehicle 1. The response generation unit 13 outputs a guide message including information relating to the estimated operation input device 3.

In step S8, the behavior determination unit 12 determines whether or not the passenger has performed a suspension instruction operation. When the passenger has performed the suspension instruction operation (step S8: Y), the process proceeds to step S9. When the passenger has not performed the suspension instruction operation (step S8: N), the process proceeds to step S11.

In step S9, the response generation unit 13 outputs the termination guide message. In step S10, the behavior determination unit 12 outputs the input operation signal to the device control unit 14. The device control unit 14 controls the in-vehicle device 2 in accordance with the input operation signal. Subsequently, the process proceeds to step S12.

In step S11, the response generation unit 13 determines whether or not the output of a guide message has been completed. When the output of a guide message has been completed (step S11: Y), the process proceeds to step S12. When the output of a guide message has not been completed (step S11: N), the process returns to step S7.

In step S12, the controller 9 determines whether or not an ignition (IGN) switch of the vehicle has been turned off. When the IGN switch has not been turned off (step S12: N), the process returns to step S1. When the IGN switch has been turned off (step S12: Y), the process terminates.

First Variation

In a first variation, the voice recognition unit 10 determines that a voice recognition start event has occurred when an operation input device 3 (that is, an operation input device other than the PTT switch 5) is operated and starts the voice recognition processing. That is, the input operation signal acquisition unit 11 acquires an input operation signal before the voice recognition unit 10 starts the voice recognition processing. For example, the voice recognition unit 10 may determine that a voice recognition start event has occurred when the voice recognition unit 10 receives an input operation signal from the input operation signal acquisition unit 11 and start the voice recognition processing.

When the passenger desires to terminate the voice recognition processing even when the passenger operates the operation input device 3 (for example, when the passenger does not need a guide message relating to the operation input device 3 and desires to immediately operate the in-vehicle device 2), the passenger can perform a predetermined suspension instruction operation. In addition, for example, the voice recognition device 4 may, when accepting a predetermined operation (such as holding down a button, repeatedly pressing a button, and rotating a dial back and forth clockwise and counterclockwise), suspend functioning of operation devices (prevents output of an input operation signal) only for a certain period and only wait to receive a voice.

For example, the passenger may perform the suspension instruction operation by operating the operation input device 3 mentioned in the utterance content again or perform the suspension instruction operation by operating an operation input device other than the operation input device mentioned in the utterance content among the plurality of operation input device 3.

When accepting a suspension instruction operation, the voice recognition unit 10 suspends voice recognition. In addition, the behavior determination unit 12 outputs an input operation signal acquired from the operation input device 3 to the device control unit 14. The device control unit 14 controls the in-vehicle device 2 in accordance with the input operation signal.

Figure 4:
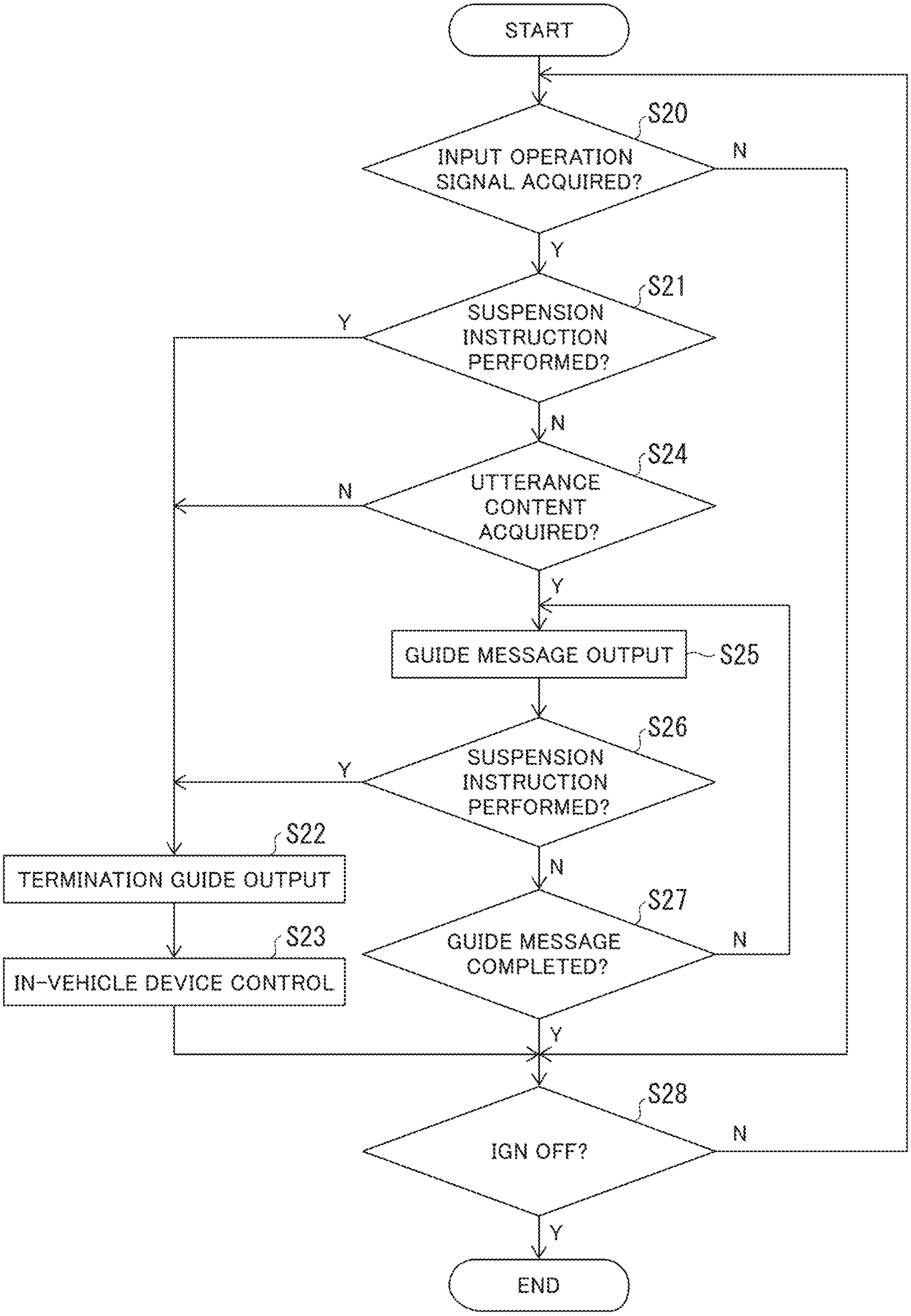
FIG. 4 is a flowchart of a voice recognition method of a first variation.

FIG. 4 is a flowchart of a voice recognition method of the first variation. In step S20, the input operation signal acquisition unit 11 determines whether or not the input operation signal acquisition unit 11 has acquired an input operation signal. When the input operation signal acquisition unit 11 has acquired an input operation signal (step S20: Y), the process proceeds to step S21. When the input operation signal acquisition unit 11 has not acquired an input operation signal (step S20: N), the process proceeds to step S28. In step S21, the behavior determination unit 12 determines whether or not the passenger has performed a suspension instruction operation. When the passenger has performed the suspension instruction operation (step S21: Y), the process proceeds to step S22. When the passenger has not performed the suspension instruction operation (step S21: N), the process proceeds to step S24. In step S22, the response generation unit 13 outputs a termination guide message. In step S23, the behavior determination unit 12 outputs the input operation signal to the device control unit 14. The device control unit 14 controls the in-vehicle device 2 in accordance with the input operation signal. Subsequently, the process proceeds to step S28.

Processing in steps S24 to S28 is the same as the processing in steps S6 to S8, S11, and S12 in FIG. 1, respectively.

Second Variation

In a second variation, as with the first variation, the voice recognition unit 10 determines that a voice recognition start event has occurred when an operation input device 3 (that is, an operation input device other than the PTT switch 5) is operated and starts the voice recognition processing. That is, the input operation signal acquisition unit 11 acquires an input operation signal before the voice recognition unit 10 starts the voice recognition processing.

In the second variation, when the voice recognition unit 10 acquires utterance content of the passenger after the input operation signal acquisition unit 11 acquires an input operation signal, the device control unit 14 executes control of the in-vehicle device 2 in accordance with the input operation signal and the response generation unit 13 also outputs a guide message relating to an operation input device 3 mentioned in the utterance content of the passenger.

Figure 5:
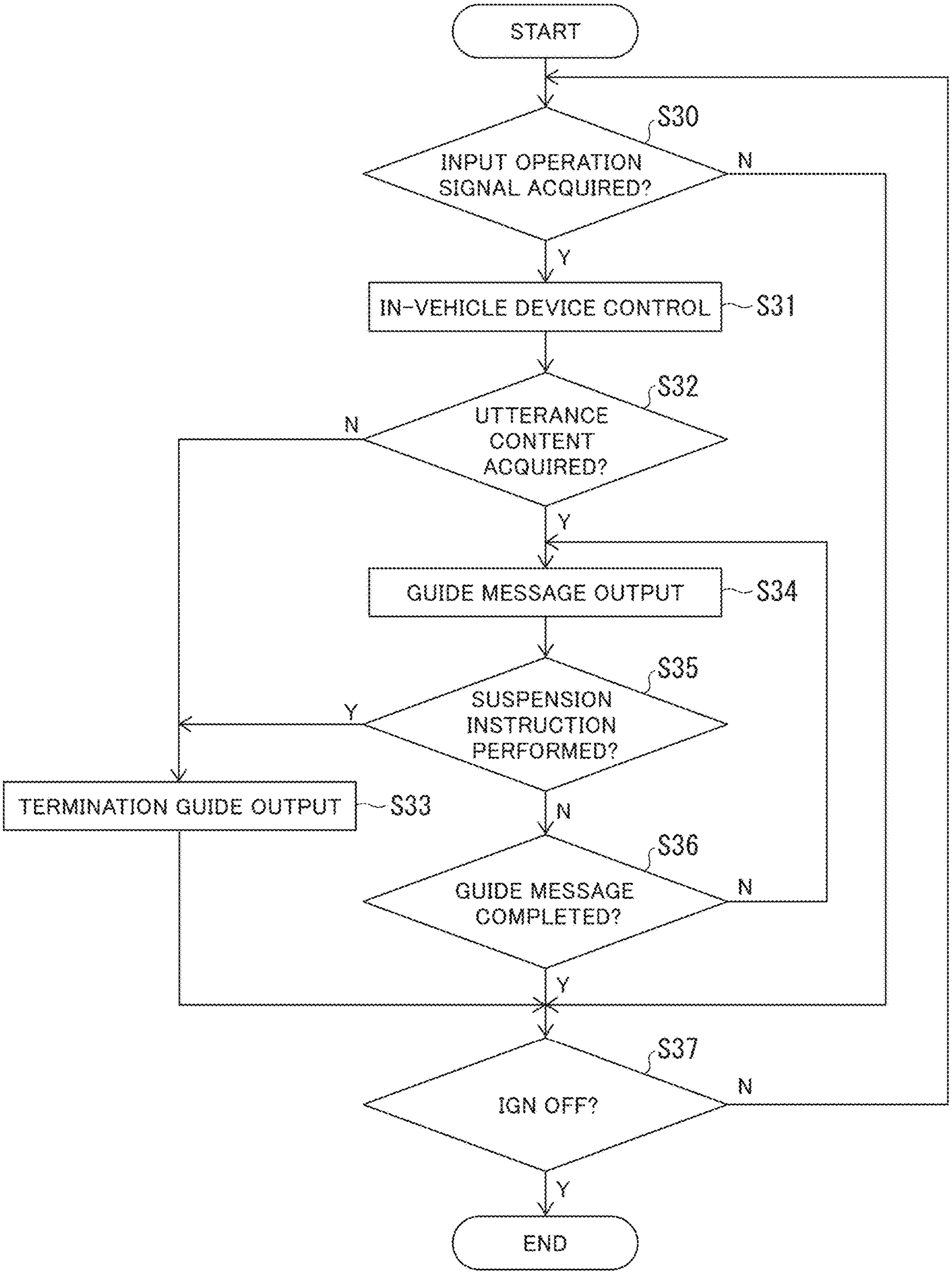
FIG. 5 is a flowchart of a voice recognition method of a second variation.

FIG. 5 is a flowchart of a voice recognition method of the second variation. In step S30, the input operation signal acquisition unit 11 determines whether or not the input operation signal acquisition unit 11 has acquired an input operation signal. When the input operation signal acquisition unit 11 has acquired an input operation signal (step S30: Y), the process proceeds to step S31. When the input operation signal acquisition unit 11 has not acquired an input operation signal (step S30: N), the process proceeds to step S37. In step S31, the behavior determination unit 12 outputs the input operation signal to the device control unit 14. The device control unit 14 controls the in-vehicle device 2 in accordance with the input operation signal.

In step S32, the behavior determination unit 12 determines whether or not the voice recognition unit 10 has acquired utterance content of the passenger. When the voice recognition unit 10 has acquired utterance content (step S32: Y), the process proceeds to step S34. When the voice recognition unit 10 has not acquired utterance content (step S6: N), the process proceeds to step S33.

In step S33, the response generation unit 13 outputs a termination guide message. Subsequently, the process proceeds to step S37.

Processing in steps S34 to S37 is the same as the processing in steps S7, S8, S11, and S12 in FIG. 1, respectively.

Third Variation

The voice recognition unit 10 may determine whether or not the type of a question is a "question relating to a method for use" of an operation input device 3. For example, when utterance content is "How can I use this switch?", the voice recognition unit 10 may determine that the type of the question from the passenger is a "question relating to a method for use" of the operation input device 3. When the type of a question is a "question relating to a method for use" of an operation input device 3, the response generation unit 13 may output a guide message including information relating to the method for use of the operation input device 3.

In addition, for example, when utterance by the passenger after an operation detection signal is received from the input operation signal acquisition unit 11 is a question, the voice recognition unit 10 may determine that the type of the question is a "question relating to a method for use" of the operation input device 3.

For example, a case is assumed where in order to start functioning of a driving assistance function of the vehicle 1, it is required to, after pressing, among steering switch group installed on the steering wheel, a first switch to switch turning on and off of the driving assistance function, press a second switch to start the functioning of the driving assistance function.

In this case, when utterance content after the passenger operates a first operation input device is "What do I have to do after this?", the voice recognition unit 10 may determine that the type of the question from the passenger is a "question relating to a method for use" of the operation input device 3. The response generation unit 13 may output an explanation message "Press the second switch." relating to a method for use of the steering switch group.

Fourth Variation

The voice recognition unit 10 may extract an operation instruction of the in-vehicle device 2 as utterance content. For example, when utterance content is "Move this." or "Set this to X.", the voice recognition unit 10 may determine that the utterance content from the passenger is an operation instruction of the in-vehicle device 2.

When the behavior determination unit 12 receives an operation detection signal from the input operation signal acquisition unit 11 and acquires utterance content including an operation instruction of the in-vehicle device 2, the behavior determination unit 12 may estimate that an operation input device 3 mentioned in the utterance content of the passenger (that is, an operation input device 3 used for operation of the in-vehicle device 2 that is an object to be operated) is an operation input device 3 that output the input operation signal. The behavior determination unit 12 outputs a control signal to operate the in-vehicle device 2 in accordance with the operation instruction in the utterance content to the device control unit 14. The device control unit 14 controls the in-vehicle device 2 in accordance with the control signal from the behavior determination unit 12.

For example, when the behavior determination unit 12, after outputting a guide message relating to the operation input device 3 having output the input operation signal as described above, acquires utterance content including an operation instruction of the in-vehicle device 2, the behavior determination unit 12 may estimate that an operation input device 3 mentioned in the utterance content including the operation instruction is the operation input device 3 in the guide message. The device control unit 14 may operate the in-vehicle device operated by the operation input device 3 in accordance with the operation instruction in the utterance content.

For example, a case is assumed where the in-vehicle device 2 is the interior overhead lamp, the operation input device 3 is the interior overhead lamp switch, and the passenger operates the interior overhead lamp switch. When after, to utterance content "What is this switch?", a guide message "This is an interior overhead lamp switch. Switching-off, door interlock switching, and switching-on of the interior overhead lamp can be operated by sliding the switch to the left side, the center, and the right side, respectively." is output as described above, the passenger speaks, "Set this to ON.", the behavior determination unit 12 may estimate that the operation input device 3 mentioned in the utterance content including the operation instruction is the interior overhead lamp switch and the in-vehicle device 2 that is the object to be operated is the interior overhead lamp and control the interior overhead lamp to an on state.

Second Embodiment

In the first embodiment, when after acquisition of an input operation signal, utterance content including a question relating to an operation input device 3 is acquired, the operation input device 3 mentioned in the utterance content of the passenger is estimated and a guide message relating to the estimated operation input device 3 is output.

In contrast, in the second embodiment, when after acquisition of utterance content including a question relating to an operation input device 3, an input operation signal is acquired, the operation input device 3 mentioned in the utterance content of a passenger is estimated and a guide message relating to the estimated operation input device 3 is output.

In a voice recognition unit 10 in the second embodiment, voice input of a wake-up word, input of a dedicated voice command to accept a question (for example, "Can I ask a question about the switch?"), or operation of a PTT switch 5 may also be detected as a voice recognition start event.

In place of this configuration, the voice recognition unit 10 in the second embodiment may constantly recognize voice input from a passenger that a microphone 8 acquires, analyze utterance content, using natural language processing, and determine whether or not a question relating to an operation input device 3 (such as "What is this switch?", "Which is the switch to do X?", "Where is the switch to do X?", "Is it correct that this switch is X?", and "I want to do X, but is this switch correct one to do that?") is input.

When a question relating to an operation input device 3 is input, a behavior determination unit 12 transitions to a standby mode in which the behavior determination unit 12 monitors an input operation signal acquisition unit 11 acquiring an input operation signal. When acquiring an input operation signal in the standby mode, the behavior determination unit 12 estimates the operation input device 3 mentioned in the utterance content of the passenger. A response generation unit 13 outputs a guide message relating to the estimated operation input device 3.

Figure 6:
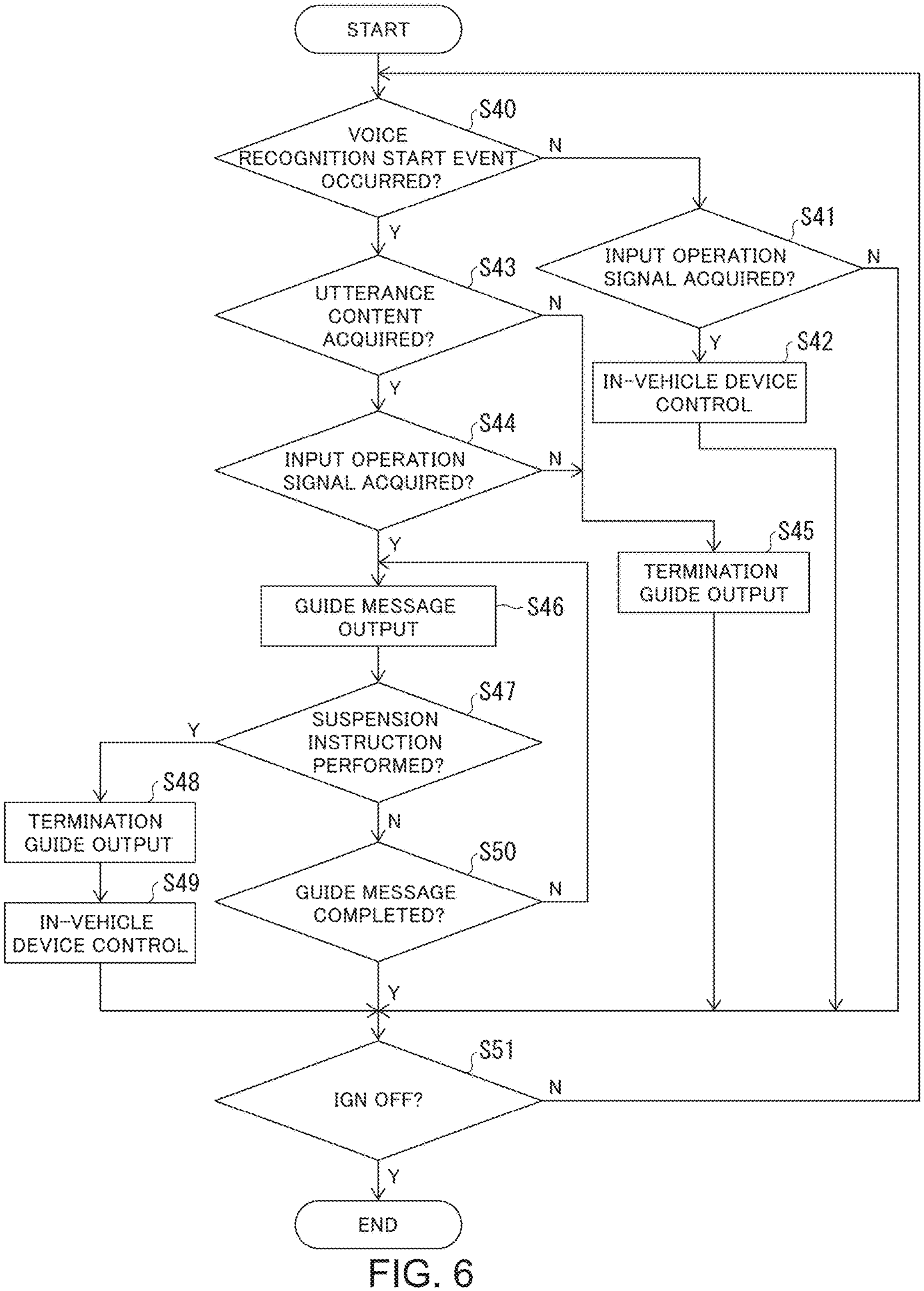
FIG. 6 is a flowchart of an example of a voice recognition method of a second embodiment.

FIG. 6 is a flowchart of an example of a voice recognition method of the second embodiment. Processing in steps S40 to S42 is the same as the processing in steps S1 to S3 in FIG. 1. When a voice recognition start event has occurred (step S40: Y), the process proceeds to step S43.

In step S43, the behavior determination unit 12 determines whether or not the voice recognition unit 10 has acquired utterance content of the passenger. When the voice recognition unit 10 has acquired utterance content of the passenger (step S43: Y), the process proceeds to step S44. When the voice recognition unit 10 has not acquired utterance content of the passenger (step S43: N), the process proceeds to step S45.

In step S44, the input operation signal acquisition unit 11 determines whether or not the input operation signal acquisition unit 11 has acquired an input operation signal. When the input operation signal acquisition unit 11 has acquired an input operation signal (step S44: Y), the process proceeds to step S46. When the input operation signal acquisition unit 11 has not acquired an input operation signal (step S44: N), the process proceeds to step S45. In step S45, the response generation unit 13 outputs a termination guide message. Subsequently, the process proceeds to step S51.

Processing in steps S46 to S51 is the same as the processing in steps S7 to S12 in FIG. 3.

Advantageous Effects of Embodiments (1) A voice recognition method includes: acquiring utterance content of a passenger in a vehicle 1; acquiring an input operation signal generated by the passenger operating an operation input device 3 of the vehicle 1; estimating a target constituent object, the target constituent object being a constituent object mentioned in the utterance content among a plurality of constituent objects constituting the vehicle 1, based on the utterance content and the input operation signal; and outputting information relating to the target constituent object.

Because of this configuration, it is possible to inform the passenger of information relating to an operation input device 3 that accepts operation input from the passenger to the in-vehicle device 2.

(2) The voice recognition method may acquire the utterance content after acquiring the input operation signal. Because of this configuration, it is possible to estimate an operation input device 3 having generated an input operation signal, as a target constituent object.

(3) For example, in a case where even when after acquiring the input operation signal, a predetermined period has elapsed, the voice recognition method does not acquire the utterance content, the voice recognition method may execute control of an in-vehicle device 2 in accordance with the input operation signal.

Because of this configuration, when no utterance content is acquired, the in-vehicle device 2 can be controlled in a similar manner to a case where the operation input device 3 is usually operated.

(4) For example, the voice recognition method may determine whether or not voice recognition processing of acquiring utterance content of the passenger is started, and when the voice recognition method acquires the input operation signal before starting the voice recognition processing, the voice recognition method may execute control of an in-vehicle device in accordance with the input operation signal without outputting information relating to the target constituent object.

Because of this configuration, when the voice recognition processing is not started, the in-vehicle device 2 can be controlled in a similar manner to a case where the operation input device 3 is usually operated.

(5) For example, the voice recognition method may determine whether or not voice recognition processing of acquiring utterance content of the passenger is started, and when the voice recognition method acquires the input operation signal before starting the voice recognition processing, the voice recognition method may execute control of an in-vehicle device in accordance with the input operation signal and also output information relating to the target constituent object.

Because of this configuration, even when it is configured such that the voice recognition processing with respect to a question relating to an operation input device 3 is started based on an operation of the operation input device 3, both control of the in-vehicle device 2 and the voice recognition processing can be achieved at the same time.

(6) For example, the voice recognition method may acquire the input operation signal after acquiring the utterance content. Because of this configuration, it is possible to estimate an operation input device 3 having generated an input operation signal, as a target constituent object.

(7) For example, when the voice recognition method detects utterance by the passenger or operation of the operation input device while outputting information relating to the target constituent object, the voice recognition method may suspend output of information relating to the target constituent object and execute control of an in-vehicle device in accordance with the input operation signal.

Because of this configuration, when information relating to a target constituent object becomes unnecessary, control of the in-vehicle device 2 can be immediately started.

(8) For example, the target constituent object may be the operation input device 3. For example, the target constituent object may be a switch, a lever, a dial, a knob, a slide bar, or a touch panel. Because of this configuration, it is possible to inform the passenger of information relating to the operation input device 3.

(9) For example, the voice recognition method may determine whether or not the utterance content is a question relating to a name, a method for use, or a use, and when the voice recognition method determines that the utterance content is a question relating to a name, a method for use, or a use, the voice recognition method may output a name, a method for use, or a use of the target constituent object as information relating to the target constituent object. Because of this configuration, it is possible to inform the passenger of a name, a method for use, or a use of the operation input device 3.

(10) For example, the voice recognition method may output a voice or an image representing information relating to the target constituent object. Because of this configuration, it is possible to inform the passenger of information relating to the operation input device 3.

The invention claimed is:

1. A voice recognition method comprising:

acquiring utterance content of a passenger in a vehicle;

acquiring an input operation signal generated by the passenger operating an operation input device of the vehicle;

estimating a target constituent object, the target constituent object being a constituent object mentioned in the utterance content among a plurality of constituent objects constituting the vehicle, based on the utterance content and the input operation signal;

outputting information relating to the target constituent object; and suspending, when utterance by the passenger or operation of the operation input device is detected while outputting information relating to the target constituent object, output of information relating to the target constituent object and executes control of an in-vehicle device in accordance with an input operation signal acquired from the operation input device.

2. The voice recognition method according to claim 1, wherein the voice recognition method acquires the utterance content after acquiring the input operation signal.

3. The voice recognition method according to claim 2, wherein in a case where even when after acquiring the input operation signal, a predetermined period has elapsed, the voice recognition method does not acquire the utterance content, the voice recognition method executes control of an in-vehicle device in accordance with the input operation signal.

4. The voice recognition method according to claim 2, wherein the voice recognition method determines whether or not voice recognition processing of acquiring utterance content of the passenger is started, and when the voice recognition method acquires the input operation signal before starting the voice recognition processing, the voice recognition method executes control of an in-vehicle device in accordance with the input operation signal without outputting information relating to the target constituent object.

5. The voice recognition method according to claim 2, wherein the voice recognition method determines whether or not voice recognition processing of acquiring utterance content of the passenger is started, and when the voice recognition method acquires the input operation signal before starting the voice recognition processing, the voice recognition method executes control of an in-vehicle device in accordance with the input operation signal and also outputs information relating to the target constituent object.

6. The voice recognition method according to claim 1, wherein the voice recognition method acquires the input operation signal after acquiring the utterance content.

7. The voice recognition method according to claim 1, wherein the target constituent object is the operation input device.

8. The voice recognition method according to claim 1, wherein the target constituent object is a switch, a lever, a dial, a knob, a slide bar, or a touch panel.

9. The voice recognition method according to claim 1, wherein the voice recognition method determines whether or not the utterance content is a question relating to a name, a method for use, or a use, and when the voice recognition method determines that the utterance content is a question relating to a name, a method for use, or a use, the voice recognition method outputs a name, a method for use, or a use of the target constituent object as information relating to the target constituent object.

10. The voice recognition method according to claim 1, wherein the voice recognition method outputs a voice or an image representing information relating to the target constituent object.

11. A voice recognition device including a controller configured to perform processing comprising:

acquiring utterance content of a passenger in a vehicle;

acquiring an input operation signal generated by the passenger operating an operation input device of the vehicle;

estimating a target constituent object, the target constituent object being a constituent object mentioned in the utterance content among a plurality of constituent objects constituting the vehicle, based on the utterance content and the input operation signal;

outputting information relating to the target constituent object; and suspending, when utterance by the passenger or operation of the operation input device is detected while outputting information relating to the target constituent object, output of information relating to the target constituent object and executes control of an in-vehicle device in accordance with an input operation signal acquired from the operation input device.

* * * * *